(12) United States Patent
Trivedi et al.

(10) Patent No.: US 9,796,633 B2
(45) Date of Patent: Oct. 24, 2017

(54) AQUEOUS SLURRY FOR MAKING A POWDER OF HARD MATERIAL

(71) Applicant: KENNAMETAL INC., Latrobe, PA (US)

(72) Inventors: Pankaj B. Trivedi, Latrobe, PA (US); Pankaj K. Mehrotra, Greensburg, PA (US); Neal S. Myers, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 15/267,804

(22) Filed: Sep. 16, 2016

(65) Prior Publication Data
US 2017/0001916 A1 Jan. 5, 2017

Related U.S. Application Data

(62) Division of application No. 14/045,152, filed on Oct. 3, 2013, now Pat. No. 9,475,945.

(51) Int. Cl.
*C04B 35/56* (2006.01)
*C08K 3/14* (2006.01)
(Continued)

(52) U.S. Cl.
CPC .............. *C04B 35/71* (2013.01); *B02C 17/18* (2013.01); *B02C 17/186* (2013.01); *B02C 23/18* (2013.01); *B22F 1/0003* (2013.01); *B22F 3/16* (2013.01); *B22F 3/22* (2013.01); *B22F 7/008* (2013.01); *B22F 9/04* (2013.01); *C04B 35/5626* (2013.01);
(Continued)

(58) Field of Classification Search
None
See application file for complete search history.

(56) References Cited

U.S. PATENT DOCUMENTS

| 3,425,954 | A | 2/1969 | Ruzevick et al. |
| 3,846,126 | A | 11/1974 | Foley et al. |

(Continued)

FOREIGN PATENT DOCUMENTS

| CN | 1972772 A | 5/2007 |
| CN | 102166648 A | 8/2011 |

(Continued)

OTHER PUBLICATIONS

Nebelung et al., "Technology of Aqueous Hard Metal Processing", Powder Metallurgical Symposium at Hagan, (Nov. 26. 27, 2009) 12 pages.
(Continued)

*Primary Examiner* — Colin W Slifka
(74) *Attorney, Agent, or Firm* — Larry R. Meenan (57) ABSTRACT

An aqueous slurry that is useful upon being spray dried for the formation of a powder of hard material. The aqueous slurry includes starting powder components of the hard material. The slurry further includes an oxidation inhibitor, a surfactant in an amount between about 0.05 weight percent and about 0.30 weight percent of the weight of the starting powder components of the hard material, a binder, a defoamer and water in an between about 15 weight percent and about 30 weight percent of the weight of the weight of the starting powder components of the hard material. The aqueous slurry has a percent solids value that is between about 70 percent and about 85 percent.

11 Claims, 7 Drawing Sheets

(51) Int. Cl.
| | |
|---|---|
| C04B 35/71 | (2006.01) |
| C09D 5/03 | (2006.01) |
| C09D 191/06 | (2006.01) |
| C08K 3/08 | (2006.01) |
| C08K 5/17 | (2006.01) |
| C08K 5/06 | (2006.01) |
| B02C 17/18 | (2006.01) |
| B02C 23/18 | (2006.01) |
| B22F 9/04 | (2006.01) |
| B22F 3/22 | (2006.01) |
| C22C 29/02 | (2006.01) |
| C22C 29/16 | (2006.01) |
| B22F 1/00 | (2006.01) |
| B22F 3/16 | (2006.01) |
| B22F 7/00 | (2006.01) |
| C04B 35/626 | (2006.01) |
| C04B 35/634 | (2006.01) |
| C08L 57/00 | (2006.01) |
| C22C 29/08 | (2006.01) |

(52) U.S. Cl.
CPC ...... *C04B 35/6263* (2013.01); *C04B 35/6264* (2013.01); *C04B 35/63488* (2013.01); *C08K 3/08* (2013.01); *C08K 3/14* (2013.01); *C08K 5/06* (2013.01); *C08K 5/17* (2013.01); *C08L 57/00* (2013.01); *C09D 5/033* (2013.01); *C09D 191/06* (2013.01); *C22C 29/02* (2013.01); *C22C 29/16* (2013.01); *B22F 2009/043* (2013.01); *B22F 2301/15* (2013.01); *B22F 2302/10* (2013.01); *B22F 2302/45* (2013.01); *B22F 2998/10* (2013.01); *C04B 2235/3847* (2013.01); *C04B 2235/405* (2013.01); *C04B 2235/94* (2013.01); *C08K 2003/0843* (2013.01); *C08L 2205/03* (2013.01); *C22C 29/08* (2013.01)

(56) References Cited

U.S. PATENT DOCUMENTS

| | | | |
|---|---|---|---|
| 3,888,662 | A | 6/1975 | Boeckeler |
| 3,895,170 | A | 7/1975 | Tanaka et al. |
| 3,985,503 | A | 10/1976 | O'Neal |
| 4,070,184 | A | 1/1978 | Scheithauer et al. |
| 4,184,991 | A | 1/1980 | Scheurman, III |
| 4,202,796 | A | 5/1980 | Jacob et al. |
| 4,315,889 | A | 2/1982 | McChesney et al. |
| 4,397,889 | A | 8/1983 | Benjamin et al. |
| 4,478,888 | A | 10/1984 | Benjamin et al. |
| 4,610,931 | A | 9/1986 | Nemeth et al. |
| 4,886,638 | A | 12/1989 | Penkunas et al. |
| 4,902,471 | A | 2/1990 | Penkunas et al. |
| 5,007,957 | A | 4/1991 | Penkunas et al. |
| 5,045,277 | A | 9/1991 | Penkunas et al. |
| RE34,180 | E | 2/1993 | Nemeth et al. |
| 5,316,573 | A | 5/1994 | Brusic et al. |
| 5,641,920 | A | 6/1997 | Hens et al. |
| 5,922,978 | A | 7/1999 | Carroll |
| 6,245,288 | B1 | 6/2001 | Carroll |
| 6,336,951 | B1 | 1/2002 | Qvick et al. |
| 6,656,976 | B2 | 12/2003 | Bergstrom et al. |
| 6,733,562 | B2 | 5/2004 | Knunz et al. |
| 6,852,274 | B2 | 2/2005 | Knunz et al. |
| 6,878,182 | B2 | 4/2005 | Kruse |
| 7,285,241 | B2 | 10/2007 | Puide |
| 7,303,722 | B2 | 12/2007 | Bruhn et al. |
| 7,387,658 | B2 | 6/2008 | Grearson et al. |
| 7,531,022 | B2 | 5/2009 | Quirmbach et al. |
| 7,537,637 | B2 | 5/2009 | Jutterstrom et al. |
| 7,666,349 | B2 | 2/2010 | Laarz et al. |
| 2005/0132843 | A1 | 6/2005 | Jiang et al. |
| 2006/0091579 | A1 | 5/2006 | Quirmbach et al. |
| 2007/0259970 | A1 | 11/2007 | Boden et al. |
| 2010/0107509 | A1 | 5/2010 | Guiselin |
| 2011/0254181 | A1 | 10/2011 | Holand et al. |
| 2012/0210822 | A1 | 8/2012 | Konyashin et al. |

FOREIGN PATENT DOCUMENTS

| | | |
|---|---|---|
| CN | 102189253 A | 9/2011 |
| CN | 102597282 A | 7/2012 |
| EP | 0963454 B1 | 12/2002 |
| EP | 1440956 A1 | 7/2004 |
| EP | 1153652 B1 | 3/2005 |
| EP | 1666616 B1 | 11/2007 |
| EP | 1806175 B1 | 3/2009 |
| EP | 1373585 B2 | 7/2009 |
| EP | 1373586 B1 | 8/2010 |
| EP | 1739197 B1 | 10/2010 |
| EP | 1742726 B1 | 2/2011 |
| WO | 9800256 | 1/1998 |

OTHER PUBLICATIONS

Laarz et al., "Dispersing WC-Co Powders in Aqueous Media with Polyethylenimine", International Journal of Refractory Metals & Hard Materials, vol. 18 (2000) pp. 281-286.

Andersson, Karin M., "Aqueous Processing of We-Co Powders", Doctoral Thesis from Royal Institute of Technology, Stockholm (2004).

ASTM 8276-05 (2010) "Standard Test Method for Apparent Porosity in Cemented Carbides", (3 pgs.).

European Search Report for European Patent Application No. 14183369.9-1353 mailed Feb. 4, 2015 (8 pages).

Harris, Daniel C., Quantitative Chemical Analysis, Michelson Laboratory, China Lake, California, 4th Edition, W.H. Freeman and Company, New York, ISBN: 0-7167-2508-8, pp. 301-302.

Put, S. et al., Functionally Graded WC-Co Hardmetals, Department of Metallurgy and Materials Engineering, Katholieke Universiteit Leuven, Kasteelpark Arenberg 44, B-3001 Leuven, Belgium, 15th International Plansee Seminar, Eds. G. Kneringer, P. Rödhammer and H. Wildner, Plansee Holding AG, Reutte (2001), vol. 2., pp. 364-374.

First Office Action dated Jul. 3, 2017.

AQUEOUS SLURRY FOR MAKING A POWDER OF HARD MATERIAL

This application is a divisional of U.S. Pat. No. 9,475,945, the entire disclosure of which is incorporated herein by reference.

BACKGROUND

The present invention pertains to an aqueous slurry for making a powder of hard material (e.g., hard carbide and metallic binder). More specifically, the present invention pertains to an aqueous slurry for making a powder of hard material such as, for example, a cemented (cobalt) tungsten carbide, and the powder of hard material, as well as an article made there from. The powder of hard material and the article made there from each possess properties that essentially meet properties of a powder of hard material formed from a solvent (i.e. Heptane)-based hard material slurry, as well as the articles made there from, respectively.

Cemented carbides (e.g., cemented (cobalt) tungsten carbide (WC—Co)) are typically used in demanding applications that require high strength, wear resistance, and high temperature deformation resistance. Strict and consistent quality control of the cemented (cobalt) tungsten carbide powders used to produce the sintered article is important to achieve products with the desired properties. Solvent-based (e.g., heptane) processing is a common and established technique to produce cemented (cobalt) tungsten carbide powders, but this technique requires rigorous environmental, health, and safety standards because of the risks associated with the flammability and disposal of the solvents.

As a result of these issues connected with the use of solvents, there has been an interest in using an aqueous slurry as a milling medium for the milling hard material components such as hard carbides and metallic binders. As set forth hereinafter, there are certain advantages inherent in using an aqueous milling slurry in contrast to using a solvent such as, for example, Heptane, in the milling slurry. The paper by Nebelung and Thiele entitled "Technology of Aqueous Hard Metal Processing" presented at the Powder Metallurgical Symposium at Hagen on Nov. 26-27, 2009 lists a number of patent documents that pertain to aqueous hard metal processing. Other publications that pertain to aqueous hard material processing include Laarz et al., "Dispersing WC—Co powders in aqueous media with polyethyleneimine", International Journal of Refractory Metals & Hard Materials, 18 (2000), pp. 281-286, and a Doctoral Thesis from the Royal Institute of Technology, Stockholm, Sweden (2004) entitled "Aqueous Processing of WC—Co Powders" by Karin M. Andersson that includes the following articles: Andersson and Bergström, "Oxidation and Dissolution of Tungsten Carbide Powder to Water", *International Journal of Refractory Metals & Hard Materials,* 18, pp. 121-129 (2000); Andersson and Bergström, "DI, VO Interactions of Tungsten Oxide and Cobalt Oxide Surfaces Measured with Colloidal Probe Technique", *Journal of Colloid and Interface Science,* 246, pp. 309-315 (2002); Andersson and Bergström, "Effect of the Cobalt Ion and Polyethyleneimine Adsorption on the Surface Forces between Tungsten Oxide and Cobalt Oxide in Aqueous Media", *Journal of the American Ceramic Society,* 85, [10], pp. 2404-2408 (2002); Laarz, Jonsson and Andersson, "The Effect of Dispersant Addition and Binder Content on the Properties of Spray-Dried WC—Co Granules", manuscript in preparation; Andersson and Bergström, "Density Measurements of Single Granules using the Atomic Force Microscope", submitted to the *Journal of the American Ceramic Society*; and Andersson and Bergström, "Friction and Adhesion of Single Spray-Dried Granules containing a Hygroscopic Polymeric Binder, submitted to *Powder Technology.*

One exemplary patent document is U.S. Pat. No. 3,846,126 to Foley et al. (filed on Jan. 15, 1973), which discloses the use of water as the solvent and polyvinyl alcohol as the binder. The Foley et al. patent discloses the use of other binders at Col. 3, lines 53-62 wherein these binders include camphor, methyl alcohol, paradichlorobenzene, chloroacetic acid, naphthalene, benzoic acid, phthalic anhydride, glycerine, Acrowax C, ethylene oxide polymers sold as Carbowax, and synthetic gums such as acrylamide and metal stearates. In Foley et al. water is the preferred vehicle for milling unless an increase in oxygen content is a concern in which case use of a solvent is sought. When the oxygen content is critical, use of a solvent is the suggested component. Other patent documents are identified and discussed hereinafter.

U.S. Pat. No. 4,070,184 to Scheithauer et al. has as a focus the use of a water soluble relatively long chain polyglycol additive. The Scheithauer et al. patent sets out the basic differences between itself and the then prior art at Col. 3, lines 37-45:

The present invention is an improvement over the most modern practice used today for preparing carbide grade powders. It involves three basic and radical departures from the common practice.
1. The use of water as a milling fluid as opposed to flammable organics.
2. The use of an open-cycle spray-drying system as opposed to closed system.
3. The use of water soluble, long-chain polyvinyl alcohol as a mixing aid instead of paraffin wax. The basic advantages of the process of this invention are cost, safety, flexibility of operation, and product improvement.

The Scheithauer et al. patent describes the spray drying process at Col. 5, lines 36-46:

Next the slurry is transferred to the spray dryer feed tank. It is heated, to about 50° C., and agitated while the Carbowax 6000 addition is made. This addition is generally 1-3%. For this grade it is preferably 2%. At this point the spray drying process begins. A suitable spray drier is a Proctor-Schwartz spray tower with two-fluid top-nozzle atomization. Some of the important drying parameters are air pressure of 20 psi, an inlet drying temperature of 200°-230° C. and an outlet temperature of 100°-130° C.

Another patent that discloses the use of water in the milling of hard materials include U.S. Pat. No. 4,397,889 to Benjamin et al. (filed Apr. 5, 1982). U.S. Pat. No. 4,478,888 to Benjamin et al. discloses spray drying at [Col. 4, lines 33-54]:

Spray drying may be carried out using commercially available spray drying equipment. The inlet and outlet air temperatures should be maintained below about 370° C. and 190° C., respectively, to prevent substantial oxidation or decarburization of the slurry constituents. The spray drying is carried out under conditions to produce an agglomerated powder mixture consisting essentially of agglomerated particles of metal carbide, metal binder and wax. Typically the size range of the agglomerated particles is from about 20 to about 150 microns. During spray drying, the slurry is generally heated to about 50° C. and agitated. A suitable spray dryer is a Protco-Schwartz spray dryer with two-fluidtop nozzle atomization. When water is the milling fluid, typical drying parameters may be an air pressure of 20 psi, drying temperature of 200°-230° C. and an outlet temperature of 100°-130° C. When organic solvents are used as the milling fluid, the spray drying is preferably performed in absent air. Spray drying temperatures are dependent on the volatility of the solvent. The spray dried agglomerates may be classified by screening to obtain a desired fraction.

U.S. Pat. No. 4,886,638 to Penkunas et al. mentions the use of water in the slurry used to make a hard material. U.S. Pat. No. 4,902,471 to Penkunas et al. discloses a slurry with an organic additive (see Col. 3, lines 16-17):

The organic compound can be an ester of a fatty acid. Some preferred esters are beeswax and carnuba wax. Some preferred fatty acids are lauric acid, myristic acid, palmitic acid, stearic acid, and combinations thereof.

U.S. Pat. No. 5,007,957 to Penkunas et al. (and U.S. Pat. No. 5,045,277 to Penkunas et al.) mentions using water and an esterfied wax (see Col. 2, lines 24-29):

The first step in forming the grade powder is to combine the binder metal powder with a solid esterified wax to form a first mixture. The preferred waxes are pure beeswax, carnauba wax, candellila wax and combinations of these, although other esterified waxes can be used.

U.S. Pat. No. 5,922,978 to Carroll discloses the use of deoxygenated water as a liquid component of the slurry with a preferred composition is at Col. 4, lines 10-16:

In a most preferred embodiment, the method comprises mixing, in essentially deoxygenated water, WC powder, Co and the organic binder described above. The WC preferably has a submicron particle size. The Co preferably has a submicron particle size. The organic binder is preferably a paraffin wax. More preferably the organic binder is a paraffin wax provided as an emulsion in water.

The Carroll '978 patent also mentions triethanolamine as a corrosion inhibitor (Col. 4, lines 17-28):

Depending on the first powder and additional component, a corrosion inhibitor, such as those known in the art (e.g., corrosion inhibitors useful in the boiler, machining and heat exchanger art), may be used. If added, the corrosion inhibitor should be one that does not, for example, hinder the densification of a part pressed from the pressable powder. Preferably the corrosion inhibitor does not contain an alkali metal, alkaline earth metal, halogen, sulfur or phosphorous. Examples of corrosion inhibitors include those described in U.S. Pat. Nos. 3,425,954; 3,985,503; 4,202,796; 5,316,573; 4,184, 991; 3,895,170 and 4,315,889. Preferred corrosion inhibitors include benzotriazole and triethanolamine.

U.S. Pat. No. 6,245,288 to Carroll also uses deoxygenated water to avoid oxygen pickup, and also discloses spray drying is the preferred drying method. See Col. 4, lines 60-64.

European Patent Application 1 440 956 A1 to Kruse (Seco Tools AB) has as a focus on using polyethylimine-based polyelectrpolyte in water and/or alcohol. In general, the Kruse patent application discloses a method of making cemented carbide bodies based on tungsten carbide and with a binder phase based on Co or combinations of Co, Ni, and Fe, or Ni and Fe by powder metallurgical methods including wet milling in alcohol or water or a mixture thereof, of powder and pressing agent to form a slurry, drying the slurry to form a granulate by spray drying, pressing the granulate to form bodies of desired shape and dimension and finally sintering.

U.S. Pat. No. 6,852,274 to Knünz et al., as well as its European counterpart European Patent No. 1 373 586 B1, disclose a spray drying process that comprises steps of: forming a sprayable slurry of hard material and metallic binder and water and spraying the slurry without the aid of a water-soluble long chain polyglycol. The parameters for the sprayable slurry are: a sprayable slurry with water as a liquid phase and having a solid particle concentration within a range of 65-85% by weight. The parameters of the spray drying are: a gas inlet temperature of substantially 160° to 220° C. and a gas exit temperature in a range of substantially 85° to 130° C., and a ratio of water added with the slurry, in liters per hour, to a tower volume of the spray tower, in $m^3$, lies between 0.5 and 1.8 and such that a maximum of 0.17 kg of slurry is atomized per $m^3$ of incoming drying gas. U.S. Pat. No. 6,733,562 to Knünz et al., which has a European counterpart as European Patent No. 1 373 585 B2, discloses a process that calls for the formation of a slurry of a hard material and metal binder and water wherein after formation of the slurry, the process requires the formation of an emulsion of a non-water soluble pressing aid and an emulsifier and water, which is then mixed with the slurry.

U.S. Pat. No. 6,656,976 to Bergstrom et al., which has European counterpart European Patent No. 1 153 652 B1, pertains to a well-dispersed slurry of mixture of WC-based and Co-based particles and water wherein one feature is the further component of a dispersant comprising 0.1-10 wt % of a polyethylenimine-based polyelectrolyte. U.S. Pat. No. 7,387,658 to Grearson et al., which has European counterpart European Patent 1 739 197 B1, discloses using water as the liquid medium along with about 1 to about 3 wt-% of a pressing agent of equal to or less than about 90 wt-% PEG [polyethylene glycol] and equal to or greater than about 10 wt-% of long chain C≥20 fatty acids, their esters and salts. U.S. Pat. No. 6,878,182 to Kruse discloses a method that includes wet milling in water the powders and pressing agent wherein the slurry is formulated to contain 0.02-0.06 wt % of a polyethylenimine-based polyelectrolyte to the cemented carbide slurry containing WC and Co.

U.S. Pat. No. 7,539,637 B2 to Jutterström et al. pertains to a method of making an agglomerated cemented carbide powder that includes wet milling, preferably in a milling liquid comprising water and/or alcohol or a mixture of water and acetone, a powder mixture containing hard constituent powder(s) and a metallic binder and pressing agents and spray drying the slurry. Before milling, from about 0.05 to about 0.50 wt-% of a complex forming and/or pH-decreasing/increasing additive such as triethanolamine, hydroxides or acids, for example, and a thickener in an amount of thickener from about 0.01 to about 0.10 wt-% is added.

U.S. Pat. No. 7,666,349 B2 to Laarz et al. (European Patent No. 1 806 175 B1 is a counterpart) concerns a method of gel-casting a cemented carbide body. One step in the method is forming an aqueous slurry of WC—Co. The text at Col. 4, lines 22-27 presents a general description:

More specifically, the method according to the present invention comprises the forming of a slurry including WC—Co cemented carbide powder and dispersant in an aqueous medium, to which is added a mono-functional monomer, a cross-linker and a suitable initiator for the system.

More details about the method are set forth at Col. 4, lines 28-61.

U.S. Pat. No. 7,285,241 B2 to Puide concerns injection molding or extruding a hard material component. One step in the process is wet milling the raw materials in water, alcohol or a combination thereof, preferably 80 wt % ethanol, and 20 wt % water, together with the ethylene oxide polymer. More details are set forth at Col. 2, line 55 through Col. 3, line 2.

U.S. Pat. No. 7,303,722 B2 to Bruhn et al. discloses a method to make a hard metal article using powder injection molding or an extrusion method. The method includes a step of wet milling in water or alcohol or a combination of water and alcohol, and the drying the slurry. The text at Col. 3, lines 3-7 provides a basic description of the wet milling:

1. Wet milling of the raw materials in water, or alcohol, or a combination thereof, preferably 80 wt % ethanol and 20 wt % water, together with 0.4-0.8 wt %, preferably 0.5-0.7 wt % stearic acid as a granulating agent for the subsequent spray drying.

U.S. Pat. No. 6,336,951 B1 to Qvick et al. discloses a method of making submicron tungsten carbide tool inserts. The method includes wet milling using ethylalcohol and water as a milling liquid. See Col. 2, lines 23-35.

PCT Publication WO98/00256 to Sandvik AB concerns a method of spray drying powder mixtures that includes spray drying cemented carbide slurries consisting of cemented carbide powder containing hard constituents in an alcohol-water solution. The text at page 3, line 31 through page 4, line 28 describes the slurry.

European Patent No. 0 963 454 B1 to Sandvik Akiebolag concerns a method of making cemented carbide by powder injection molding. According to this patent, the use of a surfactant in the milling step of the cemented carbide provides for a reduction in the level of the porosity in the sintered part. The surfactant can be a single fatty acid like hexadecanoic acid, tetradecanoic acid, 9,10 Octadecanoic acid, 9,12 Octadienoic acid or 9,12,5 Octadecatrienoic acid mixed with the powder in ethanol, acetone, benzene. Furthermore the surfactant can be some kind of organometallic compound, Zn-stearate, or corresponding alcohol to a fatty acid such as 1-hexadecanol. It can also be an amine such as octadecylamine. All these surfactants can be milled in ethanol. Paragraphs [0011] through [0015] provide more details about the method.

U.S. Pat. No. 7,531,022 to Quirmbach et al., which has European counterpart European Patent No. 1 666 616 B1, discloses a method of using a liquid in the preparation of powder mixtures on the basis of hard metals. The method comprises the steps of: (a) providing a milling liquid comprised of water and an inhibitor wherein the inhibitor being a polyvinyllactam or a mixture of a polyvinyllactam and a wax emulsion; (b) providing a powdered metal comprised of at least one hard metal; (c) combining said liquid with said powdered metal in an attritor to form a moist powder mixture; and (d) atomizing said moist powder mixture in a spray drying installation to produce a powder mixture.

United States Published Patent No. US2007/0259970 A1 to Boden et al., of which European Patent No. 1 742 726 B1 is a family member, pertains to a method for dispersing and passivating particulate powders in water and aqueous media. Water-soluble polyvinylamines and/or the initial products thereof, such as, e.g., polyvinyl formamides, are used for dispersing particulate powders in water and/or aqueous media and furthermore for passivating non-oxidic particulate powders in water.

Although the uses are with solvents, the surfactant Ethomeen has been used in slurries that include tungsten carbide and cobalt. In this regard, U.S. Pat. No. 3,888,662 to Boeckeler and U.S. Reissue Patent RE 34180 to Nemeth et al. discloses the use of Ethomeen.

| Patent | Citation | Ethomeen (details) | Solvent |
|---|---|---|---|
| U.S. Pat. No. 3,888,662 | EXAMPLE 1, Col. 8, lines 57-60 | Ethomeen S/14 | 1,1,1,trichloroethane |
| U.S. Pat. No. 3,888,662 | EXAMPLE III, Col. 13, lies 10-26 | Ethomeen S/15 | perchloroethylene |
| USRE34180 | EXAMPLE NO. 1, Col. 7, lines 25-36 | Ethomeen S-15 | perchloroethylene |
| USRE34180 | EXAMPLE NO. 4, Col. 9, line 53 | Ethomeen S-15 | perchloroethylene |
| USRE34180 | EXAMPLE NO. 5, Col. 10, line 63 | Ethomeen S-15 | perchloroethylene |
| USRE34180 | EXAMPLE NO. 6, Col. 11, line 23 | Ethomeen S-15 | perchloroethylene |
| USRE34180 | EXAMPLE NO. 7, Col. 12, line 19 | Ethomeen S-15 | Soltrol 130 (a solvent) |
| USRE34180 | EXAMPLE NO. 12, Col. 16, line 18 | Ethomeen S-15 | perchloroethylene |
| USRE34180 | EXAMPLE NO. 13, Col. 17, line 20 | Ethomeen S-15 | perchloroethylene |
| USRE34180 | EXAMPLE NO. 14, Col. 17, line 57 | Ethomeen S-15 | perchloroethylene |

While the above documents show that others have used water as a milling medium for the milling of hard materials, there remain drawbacks to the use of water as a milling medium for hard materials such as, for example, cemented (cobalt) tungsten carbide. Some of these drawbacks include insolubility of the binders, surfactants and other additives in water, which results in powders (a powder if hard material) with inhomogeneous and inconsistent properties. This insolubility has generated the necessity to mill the slurry for a longer time in order to achieve the specified powder properties. Milling for a longer time increases the production costs and essentially reduces the production capacity of a ball mill, as well as increases the amount of iron contamination during the milling using a steel-lined ball mill. A higher content of iron contamination can increase the potential for metallurgical defects in the sintered article. Another drawback with aqueous milling is the potential for the powder to oxidize.

Other properties that would be advantageous to possess include providing a process that results in powder of a hard material that exhibits an increase in the granule size of the powder batch, achieves narrow granule size distributions, is easier to discharge the powder slurry from the ball mill, and possesses a reduction in the pressing pressure necessary for satisfactory compaction of the powder into the green body which is thought to minimize die wear as well as cracking in the sintered article.

Therefore, it would be highly desirable to provide an aqueous slurry for making a powder of hard material that does not require a longer milling time in order to achieve the specified powder properties. A reduction in the milling time decreases the production costs and essentially increases the production capacity of a ball mill, as well as decreases the amount of iron contamination during the milling. A lower content of iron contamination can decrease the metallurgical defects (e.g., porosity) in the sintered article. It would also be highly desirable to provide an aqueous slurry for making a powder of hard material that results in powder of a hard material that exhibits an increase in the granule size of the powder batch, achieves narrow granule size distributions, is easier to discharge the powder slurry from the ball mill, and possesses a reduction in the pressing pressure necessary for satisfactory compaction of the powder into the green body which is thought to minimize die wear as well as cracking in the sintered article.

SUMMARY

In one form thereof, the invention is an aqueous slurry useful upon being spray dried for the formation of a powder of hard material. The aqueous slurry comprises starting powder components of the hard material; an oxidation inhibitor in an amount between about 0.2 weight percent and about 0.5 weight percent of the weight of the starting powder components of the hard material; a surfactant in an amount between about 0.05 weight percent and about 0.30 weight percent of the weight of the starting powder components of the hard material; a binder in an amount between about 1.2 weight percent and about 4.0 weight percent of the weight of the starting powder components of the hard material; a defoamer in an amount between about 0.05 weight percent and about 0.35 weight percent of the weight of the starting powder components of the hard material; and water in an between about 15 weight percent and about 30 weight percent of the weight of the starting powder components of the hard material. The aqueous slurry has a percent solids between about 70 percent and about 85 percent wherein the percent solids comprises a quotient in percent of the weight of the starting powder components of the hard material divided by the sum of the weight of the starting powder components of the hard material and the weight of the water.

In another form thereof, the invention is a process for making an aqueous slurry for the formation of a hard material powder comprising the steps of: providing a ball mill; ball milling a mixture of the following: media, starting powder components of the hard material, an oxidation inhibitor in an amount between about 0.2 weight percent and about 0.5 weight percent of the weight of the starting powder components of the hard material, a surfactant in an amount between about 0.05 weight percent and about 0.30 weight percent of the weight of the starting powder components of the hard material, a binder in an amount between about 1.2 weight percent and about 4.0 weight percent of the weight of the starting powder components of the hard material, a defoamer in an amount between about 0.05 weight percent and about 0.35 weight percent of the weight of the starting powder components of the hard material, and water in an amount between about 15 weight percent and about 30 weight percent of the weight of the starting powder components of the hard material; and a media:powder ratio comprising a quotient of the weight of the media divided by the weight of the starting powder components of the material, and wherein the media:powder ratio ranging between about 4.0 and about 6.5.

In yet another form thereof, the invention is a powder of hard material produced by the process comprising the steps of: spray drying an aqueous slurry comprising: starting powder components of the hard material; an oxidation inhibitor in an amount between about 0.2 weight percent and about 0.5 weight percent of the weight of the starting powder components of the hard material; a surfactant in an amount between about 0.05 weight percent and about 0.30 weight percent of the weight of the starting powder components of the hard material; a binder in an amount between about 1.2 weight percent and about 4.0 weight percent of the weight of the starting powder components of the hard material; a defoamer in an amount between about 0.05 weight percent and about 0.35 weight percent of the weight of the starting powder components of the hard material; and water in an between about 15 weight percent and about 30 weight percent of the weight of the weight of the starting powder components of the hard material. The aqueous slurry has a percent solids between about 70 percent and about 85 percent wherein the percent solids comprises a quotient in percent of the weight of the starting powder components of the hard material divided by the sum of the weight of the starting powder components of the hard material and the weight of the water.

In still another form thereof, the invention is an article of hard material produced by a process comprising the steps of: spray drying an aqueous slurry to form a powder of hard material, and the aqueous slurry comprising: powder components of the hard material; an oxidation inhibitor in an amount between about 0.2 weight percent and about 0.5 weight percent of the weight of the starting powder components of the hard material; a surfactant in an amount between about 0.05 weight percent and about 0.30 weight percent of the weight of the starting powder components of the hard material; a binder in an amount between about 1.2 weight percent and about 4.0 weight percent of the weight of the starting powder components of the hard material; a defoamer in an amount between about 0.05 weight percent and about 0.35 weight percent of the weight of the starting powder components of the hard material; and water in an amount between about 15 weight percent and about 30 weight percent of the weight of the weight of the starting powder components of the hard material. The aqueous slurry has a percent solids between about 70 percent and about 85 percent wherein the percent solids comprises a quotient in percent of the weight of the starting powder components of the hard material divided by the sum of the weight of the starting powder components of the hard material and the weight of the water. The process further comprises the step of consolidating the powder of hard material into the article.

BRIEF DESCRIPTION OF THE DRAWINGS

The following is a brief description of the drawings that form a part of this patent application.

DETAILED DESCRIPTION

The present invention pertains to an aqueous slurry for making a powder of hard material (e.g., hard carbide and metallic binder). More specifically, the present invention pertains to an aqueous slurry for making a powder of hard material such as, for example, a cemented (cobalt) tungsten carbide, and the powder of hard material, as well as the article made there from. The powder of hard material and the article made there from each possess properties that essentially meet properties of a powder of hard material formed from a solvent-based hard material slurry, as well as the articles made there from, respectively.

In reference to the process to make the powder of hard material, a written description of the steps is set forth below. This process has application to produce powder grades of a variety of specific compositions of powders of hard material. These compositions include powder components that can comprise one or more powders of carbides, nitrides and carbonitrides of the Tungsten, Chromium, Vanadium, Tantalum, Titanium, Molybdenum, Zirconium and Niobium with binder metals comprising one or more of Cobalt, Iron, Nickel, Ruthenium, Aluminum, Manganese, Silicon and Copper and their alloys. For the specific ingredients mentioned herein, the specific powder grade that results from this process is a cemented (cobalt) tungsten carbide powder that is of a composition of between about 93 weight percent and about 94 weight percent tungsten carbide and between about 6 weight percent and about 7 weight percent cobalt.

The initial step comprises adding deionized water (DI Water) and milling media and alkylpolyalkyleneglycolether, which in this specific embodiment is available under the name Contraspum K1012 from Zschimmer & Schwarz GmbH & Co. KG in Langstein, GERMANY to a steel-lined ball mill, and then stirring this mixture in the steel-lined ball mill for about 1 minute. The content of the alkylpolyalkyleneglycolether is in weight percent of the total powder components. More specifically, in an embodiment where the powder batch is tungsten carbide and cobalt and the alkylpolyalkyleneglycolether is 0.2 weight percent, 5000 grams of tungsten carbide and cobalt powder would generate a 10 grams addition of the alkylpolyalkyleneglycolether. In this specific embodiment, the media comprises 5 millimeter (mm) cycloids that comprise a cemented (cobalt) tungsten carbide that is of a composition that comprises about 94 weight percent tungsten carbide and about 6 weight percent cobalt. As one skilled in the art can appreciate, the actual amounts of the components, as well as the media:powder ratio (i.e., the quotient of the weight of the media (e.g., cemented (cobalt) tungsten carbide cycloids) divided by the total weight of the powder components), will vary depending upon the specific powder grade and powder batch size to be produced by the process.

The second step comprises adding a mixture of amines and vinyl polymers in an aqueous solution to the post-stirred mixture of the first step that is in the steel-lined ball mill. In this specific embodiment, the mixture of aqueous amines and vinyl polymers is available under the name Product KM1508 from Zschimmer & Schwarz GmbH & Co. KG in Langstein, GERMANY, which according to the product brochure is an oxidation inhibitor for aqueous preparation of hard metals. The content of the mixture of the aqueous amines and vinyl polymers (or the volume of aqueous amines as referred to below when using METAMAX I-15) as based on 100 percent active matter content is in weight percent of the total powder components. After adding the mixture of amines and vinyl polymers in an aqueous solution to form a new mixture, the new mixture is then stirred in the steel-lined ball mill for about 1 minute.

Still referring to the second step, there should be an appreciation that a volume of aqueous amines can be an alternative for the mixture of amines and vinyl polymers in an aqueous solution. These aqueous amines are available under the name METAMAX I-15 from Zschimmer & Schwarz GmbH & Co. KG in Langstein, GERMANY, which according to the product brochure is an oxidation inhibitor for aqueous preparation of hard metals. Further, there is the contemplation that mixture of amines and vinyl polymers in an aqueous solution (e.g., Product KM1508) and the volume of aqueous amines (e.g., METAMAX I-15) can be used together. Table A below sets forth some of the properties of Product KM1508 and METAMAX I-15 as taken from the product brochures.

TABLE A

Properties of Product KM1508 and METAMAX I-15

| Material/Property | Product KM1508 | METAMAX I-15 |
|---|---|---|
| appearance | clear, slightly yellowish, viscous liquid | clear-turbid, colourless liquid |
| solubility in water | soluble in any proportion | unrestrictedly soluble |
| density | approx. 1.07 g/cm$^3$ | approx. 1.05 g/cm$^3$ |
| water content | not reported | approx. 88% |
| active matter | approx. 28% | not reported |

The third step comprises adding a wax dispersant to the post-stirred mixture of the second step in the steel-lined ball mill, and then stirring (or ball milling) the new mixture in the steel-lined ball mill for a pre-selected time depending upon the powder batch size and the powder grade. The content of the wax dispersant is in weight percent of the total powder components. In this specific embodiment, the wax dispersant is available under the name METAMAX B-4 from Zschimmer & Schwarz GmbH & Co. KG in Langstein, GERMANY, which according to the product brochure is a wax dispersion useful as a binding and pressing agent. Table B below sets forth some of the properties of METAMAX B-4 as taken from the product brochures.

TABLE B

Properties of METAMAX B-4

| Material/Property | METAMAX B-4 |
|---|---|
| appearance | white liquid |
| active matter | approx. 55% |
| solubility | water-miscible |
| pH (10%) | approx. 6 |
| viscosity (20° C.) | approx. 400 mPas |

The fourth step comprises adding the powder components to the post-stirred mixture of the third step, and then stirring (or ball milling) the new mixture in the steel-lined ball mill for a pre-selected time dependent upon the powder batch size and the powder grade. In this specific embodiment, for WC—Co grade, the powders comprise only the tungsten carbide powder and the cobalt powder. The particle size of the starting powders (e.g., tungsten carbide powder and cobalt powder) can range between submicron (less than 1 micron) to about 50 microns. There should be an appreciation that the basic process is applicable to produce powder grades that comprise of one or more of carbides, nitrides, carbonitrides of Tungsten, Chromium, Vanadium, Titanium, Zirconium, Molybdenum, Tantalum and Niobium and binder metals comprising one or more of Cobalt, Iron, Nickel, Ruthenium, Aluminum, Manganese, Silicon and Copper and their alloys.

The fifth step comprises adding polyoxyethylene (5) soyaalkylamines, which has application as a surfactant, to the post-ball milled mixture of the fourth step in the steel-lined ball mill. In this specific embodiment, the polyoxyethylene (5) soyaalkylamine is available under the name "Ethomeen" from ZZ Amsterdam, The Netherlands. Table C below sets forth some properties of the Ethomeen S/15 product.

TABLE C

Properties of Ethomeen S/15

| | Limits |
|---|---|
| Amine number | 113-119 |
| Equivalent Mass | 470-495 |
| Gardner | 0-10 |
| Moisture | 1% max |
| Primary + Secondary Amine | 2% max |

| Chemical and physical data | Typical values |
|---|---|
| Appearance | Liquid @25 C. |
| Cloud point | 8 C. |
| Flash point | >150 C. |
| HLB value | 11.1 Davies Scale 0-40 |
| Initial Boiling Point C. (@mm Hg) | >300(760) C. (@mm Hg) |
| Melting point | 6 C. |
| Pour point | 7 C. |
| Specific Gravity | 0.952(25) |
| Specific Heat BTU/Lb/F. | 0.470(77), 0.474(122) BTU/Lb/F. |
| Surface Tension dynes/cm (% solution) | 33(0.1), 33(1.0) dynes/cm (% solution) |
| Vapor Pressure mm Hg @20 C. | <1 mm Hg @20 C. |

The content of the polyoxyethylene (5) soyaalkylamine (e.g., Ethomeen) is in weight percent of the total powder components. There is the contemplation that the content of the polyoxyethylene (5) soyaalkylamine (e.g., Ethomeen) can vary from 0 weight percent to about 0.25 weight percent of the total starting powder components. As another range, the content of the polyoxyethylene (5) soyaalkylamine can range between about 0.05 weight percent about 0.20 weight percent of the total starting powder components. Ethomeen is available in a number of different grades and there is the contemplation that each one of the grades of Ethomeen will function in a satisfactory fashion.

After adding the polyoxyethylene (5) soyaalkylamines, which typically takes place between about 15 minutes to about 30 minutes before the slurry is ready for discharge from the ball mill, the mixture is and then stirred (or ball milling) in the steel-lined ball mill for a pre-selected time dependent upon the powder batch size and the powder grade. The result is the production of an aqueous slurry.

The sixth step comprises discharging the aqueous slurry after the milling per the fifth step into a metal container. The seventh step is to sieve the discharged mixture of the sixth step through about 200 mesh screen. The eighth step comprises transferring the sieved slurry of the seventh step to a feed tank.

The ninth step comprises adding DI (deionized) water to the ball mill to recover additional powder, and then spray drying the slurry to achieve a dry powder with specific properties. Ranges for the spray drying parameters are as follows:
Inlet temperature: about 370° C. to about 400° C.
Outlet temperature: about 90° C. to about 120° C.
Nozzle Size: about 0.5 to about 3 millimeter
Nozzle Pressure: about 10 to about 20 bar
Chamber Pressure: about −5 to about −7 mbar.
Specific parameters used in the examples were for powders sprayed using following parameters:
Inlet temperature: about 380° C.
Outlet temperature: about 110° C.
Nozzle Size: about 1.15 mm
Nozzle Pressure: about 15 bar
Chamber Pressure: about −6 millibar The tenth step comprises pressing the sprayed powder into a green body.

The eleventh step comprises vacuum sintering the green body into a sintered article at a peak temperature between about 2500° F. (1371° C.) and about 2900° F. (1593° C.) for a duration at peak temperature between about 30 minutes and about 120 minutes. One specific sintering parameter used in the examples is a vacuum sinter at a temperature equal to about 2825° F. (1551.6° C.) for a duration equal to about 45 minutes. The following specific properties can be measured: magnetic saturation, coercive force, hardness, density, porosity, and microstructure.

Specific powder batches were produced according to the above process wherein certain properties of these powder batches were measured and reported hereinafter. The powder was pressed and sintered to produce a consolidated, sintered article. Certain properties of the sintered article were measured and reported hereinafter. Table D below sets forth the details of the processes that produced the specific powder batches (i.e., powder of hard material) and articles discussed hereinafter. The objective of the process was to produce a powder of hard material comprising a cemented (cobalt) tungsten carbide powder that is of a composition of between about 93 weight percent and about 94 weight percent tungsten carbide and between about 6 weight percent and about 7 weight percent cobalt.

TABLE D

Specific Process Parameters

| Process Step | Specific Parameters |
|---|---|
| First Step | The initial step comprises adding:<br>deionized water (DI Water) in the amount of 1250 grams (25 wt. % of the total powder components which equals 5000 grams)<br>media (5 mm cycloids comprising WC(94 wt %)-Co(6 wt %) wherein the cycloids have a weight of either 21,000 grams (for a media:powder ratio equal to 4.2) or 30,000 grams (for a media:powder ratio equal to 6.0)<br>alkylpolyalkyleneglycolether (i.e., Contraspum K1012 which is a defoamer) in the amount of 10 grams |
| Second Step | The second step comprises:<br>adding a mixture of amines and vinyl polymers in an aqueous solution (i.e., Product KM1508 which is an oxidation inhibitor) in the amount of 50 grams (0.28 wt % based on active matter content of the total powder components)<br>with the option of adding Metamax I-15, which is an oxidation inhibitor, in the amount of 115 grams (which is 0.28 wt % based on active matter content of the total powder components) |
| Third Step | The third step comprises:<br>adding a wax dispersant (binder) available under the name METAMAX B-4 in the amount of 133 grams (1.46 wt % based on active matter content of the total powder components) |
| Fourth Step | The fourth step comprises:<br>adding the powder components of tungsten carbide powder (average particle size of 30-40 microns) and cobalt powder (average particle size 1-2 microns). The total weight of the powder components is 5000 grams with the tungsten carbide powder comprising 4700 grams and the cobalt powder comprising 300 grams.<br>8-10 hours ball milling |

TABLE D-continued

Specific Process Parameters

| Process Step | Specific Parameters |
|---|---|
| Fifth Step | The fifth step comprises adding:<br>polyoxyethylene (5) soyaalkylamines which is available under the name "Ethomeen", which is a surfactant<br>there were four different amount relating to the "Ethomeen ®" content, and they were:<br>no "Ethomeen" (0 weight percent of the total powder components)<br>3.75 grams of "Ethomeen" (0.075 weight percent of the total powder components)<br>7.50 grams of "Ethomeen" (0.15 weight percent of the total powder components)<br>12.5 grams of "Ethomeen" (0.25 weight percent of the total powder components) |
| Tenth Step | spray drying the slurry under the following parameters:<br>Inlet temperature: 380° C.<br>Outlet temperature: 110° C.<br>Nozzle Size: 1.15 mm<br>Nozzle Pressure: 15 bar<br>Chamber Pressure: −6 millibar |
| Eleventh Step | The eleventh step comprises vacuum sintering the green body at 2825° F. (1551.6° C.) for 45 minutes |

Figure 1:
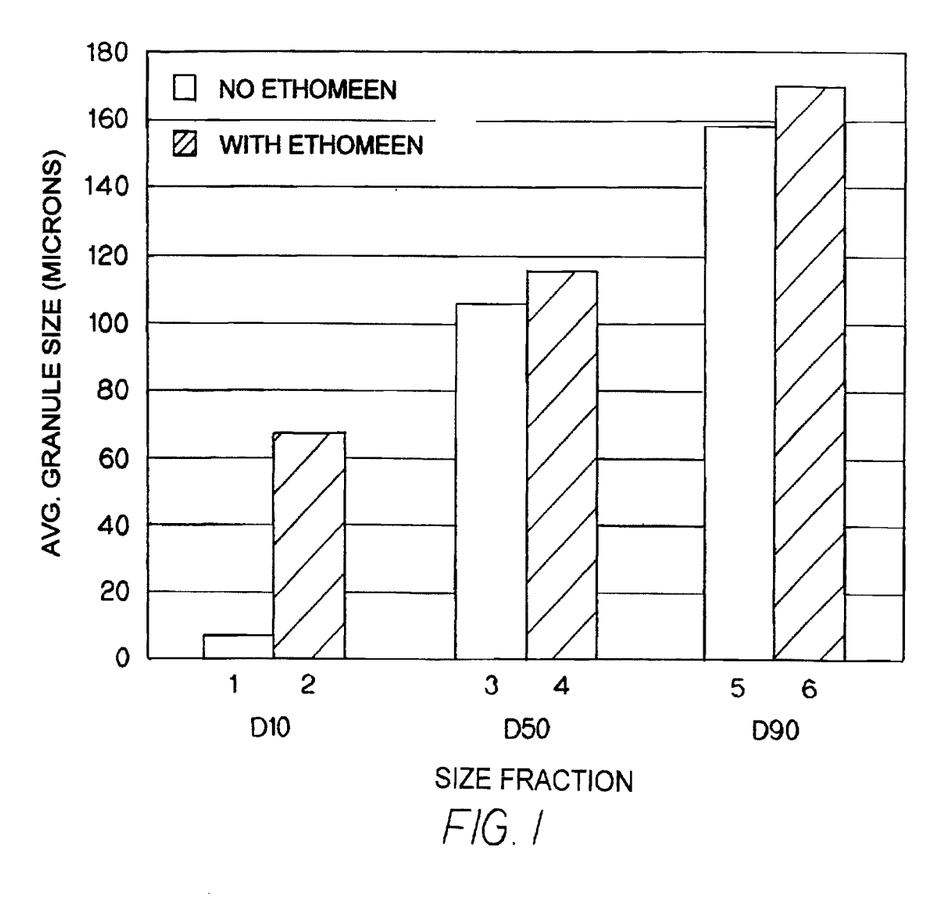
FIG. 1 is a graph that reports the average granule size in microns for powder batches (i.e., powder of hard material)

FIG. 1 comprises a graph that reports the average granule size in microns for each of three groupings of powder. Each powder grade comprises about 94 weight percent tungsten carbide and about 6 weight percent cobalt. The compositions shown by the clear bars (i.e., without lining) did not use Ethomeen. The compositions show by the bars with the lining used Ethomeen as a surfactant. Granule size distributions of the powder batches are represented as $D_{10}$, $D_{50}$ and $D_{90}$, where $D_{50}$ is the median granule size that splits the granule size distribution with half above and half below this size; 90% of granules fall below $D_{90}$ size and 10% of granules are smaller than $D_{10}$ size. More specifically, the powder batch that did not use Ethomeen, average $D_{10}$ is 7.0 micron, $D_{50}$ is 106.0 microns and $D_{90}$ is 159.0 microns. For the powder batches that used Ethomeen, the average $D_{10}$ is 67.8 microns, $D_{50}$ is 115.8 microns and $D_{90}$ is 169.9 microns. FIG. 1 shows results that reflect about a 20% increase in the average granule size with the use of "Ethomeen" in the processing of the powders. Further, the powder batches that used "Ethomeen" had a narrow size distribution.

Figure 2:
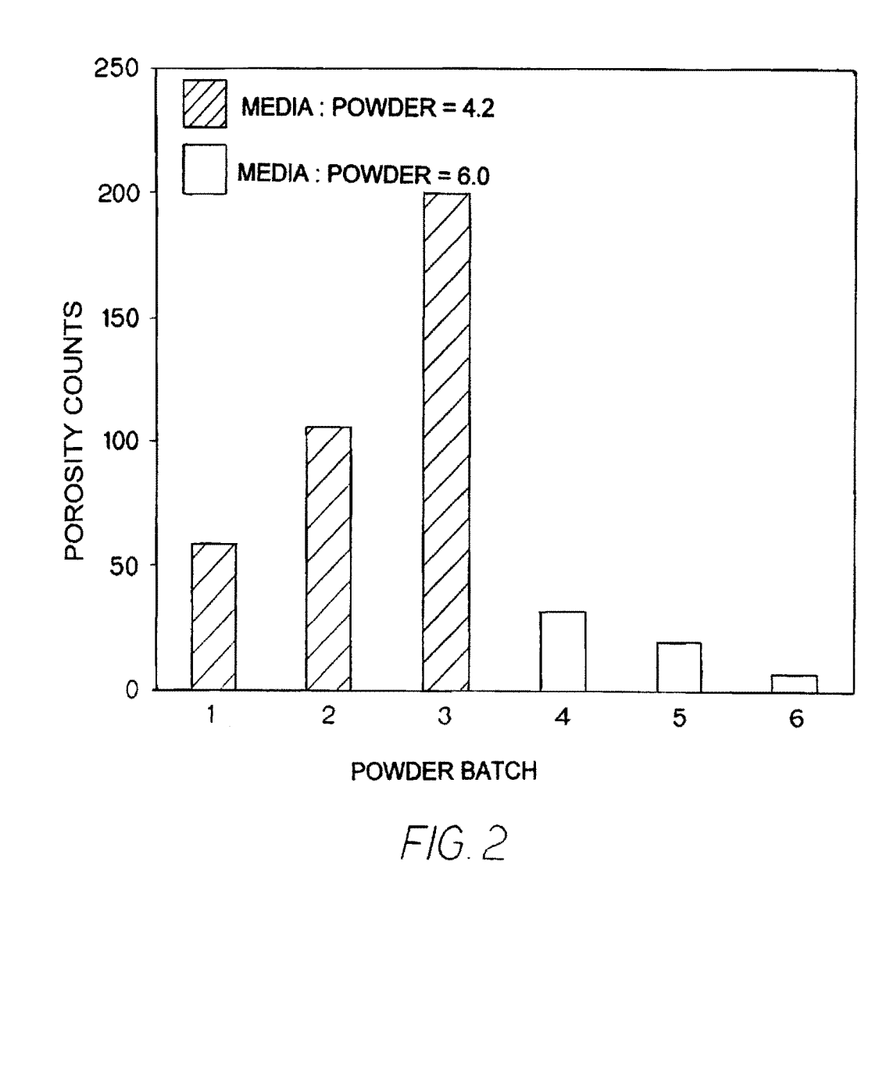
FIG. 2 is a bar chart that reports the counts of pores (that have a size greater than 25 microns per unit area) in sintered articles made from powder batches (i.e., powder of hard material) with different media:powder ratio.

Referring to FIG. 2, FIG. 2 is a bar chart that reports the counts of the pores (that have a size greater than 25 microns per unit area) in the sintered article. The technique used to determine the counts for the porosity was ASTM B276-05 (2010) "Standard Test Method for Apparent Porosity in Cemented Carbides". The microstructural defects of porosity can play an important role in the fracture initiation, and therefore, there is a need to control the content of porosity to avoid premature failure of the sintered article. Although pressure-sinter operations may reduce the number of pores in the microstructure, such operations add cost to the overall process. As the results below demonstrate, the present invention reduces the porosity in vacuum sintered material without the need to pressure-sinter the article. In the discussion below, as well as throughout the entire application, the use of Ethomeen is synonymous with the scientific term polyoxyethylene (5) soyaalkylamine. There is no intention to limit the scope by the use of "Ethomeen" instead of polyoxyethylene (5) soyaalkylamine.

In reference to the process parameters, for Bars Nos. 1 and 2, the media:powder ratio was equal to 4.2, the inhibitor was Metamax I-15, and the process did not use "Ethomeen". For Bar No. 3, the media:powder ratio was equal to 4.2, the inhibitor was KM1508, and the process did not use "Ethomeen". For Bars Nos. 4 and 5, the media:powder ratio was equal to 6.0, the inhibitor was Metamax I-15, and the process did not use "Ethomeen". For Bar No. 6, the media:powder ratio was equal to 6.0, the inhibitor was KM1508, and the process did not use "Ethomeen". The results reported in FIG. 2 show that the higher media:powder ratio reduced the number of pores (with a size greater than 25 microns per unit area) in the sintered article. The increase in the cycloid weight, as represented by the increase in the media:powder ratio, increases the milling efficiency and improves the dispersion of binders and other organic additives. This improvement in dispersion allows for easier removal of binder during sintering.

Referring to Table 1, Table 1 reports the data that is shown in FIG. 2. The M&P # in Table 1 corresponds to the Powder Batch number in FIG. 2 per the Table E below.

TABLE E

Correspondence between Table 1 and FIG. 2

| Table 1 | FIG. 2 |
|---|---|
| CT2331274 | 1 |
| CT2331901 | 2 |
| CT2034326 | 3 |
| CT2531119 | 4 |
| CT2454375 | 5 |
| CT2454373 | 6 |

Figure 3:
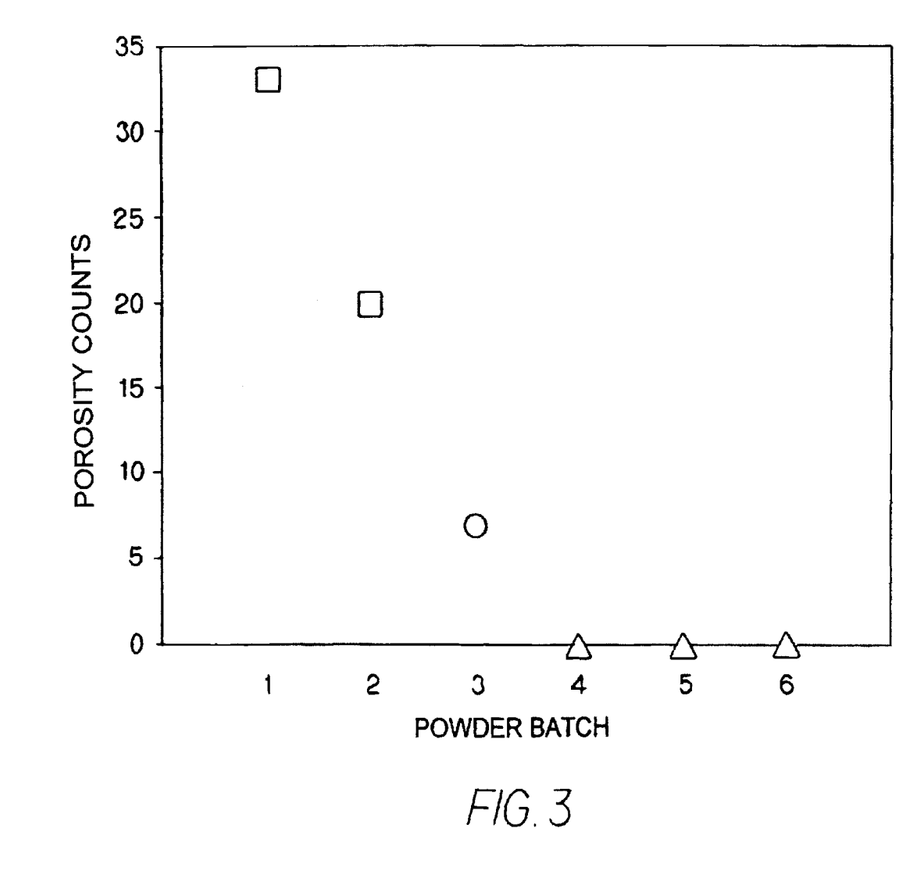
FIG. 3 is a graph that reports the count of pores (that have a size greater than 25 microns per unit area) in sintered article made from powder batches (i.e., powder of hard material) with different mill additives (i.e., inhibitors and surfactant)

Referring to FIG. 3, this is a graph that reports the number of pores (that have a size greater than 25 microns per unit area) in the sintered article. The technique used to determine the counts for the porosity was ASTM B276-05 (2010). All of the data reported in FIG. 3 were from a sintered article made via a process in which the media:powder ratio was equal to 6.0. The composition of the article is about 94 weight percent tungsten carbide (coarse grain) and about 6 weight percent cobalt. The data points that are in the form of squares, comprise the results from a sintered article made via a process that did not use "Ethomeen" and did not use KM1508 as an inhibitor. The data point that is in the form of a circle comprises the results from a sintered article made via a process that did not use "Ethomeen", but did use KM 1508 as an inhibitor. The data points that are in the form of a triangle comprises the results from a sintered article that used "Ethomeen" and also used the inhibitor KM 1508. It becomes apparent from the data reported in FIG. 3 that the use of "Ethomeen" and the inhibitor KM 1508 reduced the number of pores (that have a size greater than 25 microns per unit area) in the sintered articles.

It appears that the best results (i.e., least number of pores with a size greater than 25 microns per unit area) occur when the Ethomeen (polyoxyethylene (5) soyaalkylamine) is present in an amount equal to or greater than about 0.15 weight percent of the weight of the starting powder components.

The KM1508 inhibitor may contain a green-strength additive that can contribute to the drop in the number of pores (that have a size greater than 25 microns per unit area). It also appears that the use of Ethomeen helps with the dispersion of wax, typically used in this process, and subsequently makes the de-binding process during sintering more effective.

Referring to Table 2, Table 2 reports the data that is shown in FIG. 3. The M&P # in Table 2 corresponds to the Powder Batch number in FIG. 3 per the Table F below.

TABLE F

Correspondence between Table 2 and FIG. 3

| Table 2 | FIG. 3 |
|---|---|
| CT2631119 | 1 |
| CT2454375 | 2 |
| CT2454373 | 3 |
| CT2474995 | 1 |
| CT2531271 | 2 |
| CT2536520 | 3 |

Figure 4:
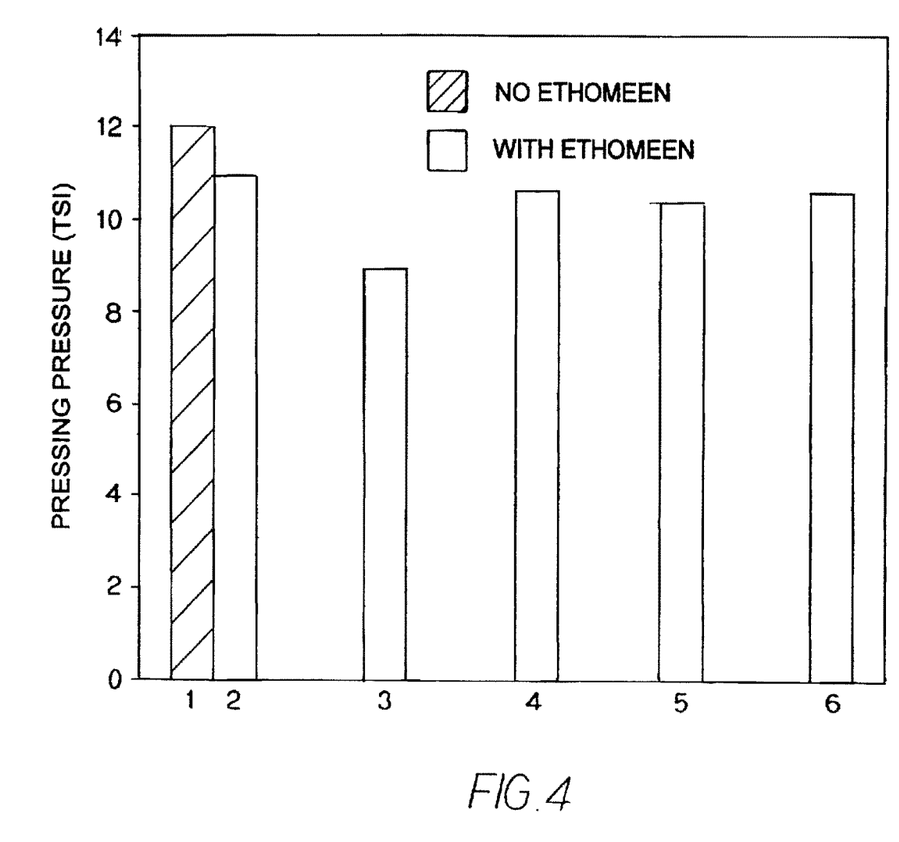
FIG. 4 is a bar chart reports the pressing pressure for powder batches (i.e., powder of hard material) with and without Ethomeen surfactant.

Referring to FIG. 4, this bar chart reports the pressing pressure for six powder batches that have a composition that comprised about 94 weight percent tungsten carbide and about 6 weight percent cobalt, (or processing parameters). The powder batch represented by the bar with lining was produced without using "Ethomeen". The powder batches represented by the clear bars (without lining) were produced by a process using "Ethomeen". The 1.2 Die Factor pressing pressure was reduced by about 8 percent in the WC—Co coarse grain powder when 0.15 weight percent Ethomeen (polyoxyethylene (5) soyaalkylamine) was used in the aqueous slurry. The 1.2 Die Factor pressing pressure was reduced by about 25 percent in the WC—Co coarse grain powder when 0.25 weight percent Ethomeen (polyoxyethylene (5) soyaalkylamine) was used in the aqueous slurry. On average, there is a 13% reduction in the 1.2 Die Factor (DF) pressing pressure resulting from the use of "Ethomeen" in the process to make the powder batch. There is a contemplation that the drop in the 1.2 Die Factor pressing pressure could be due to an increase in the Scott density, which provides better powder packing characteristics. This provides a benefit in that higher pressing pressures can lead to cracks in the sintered articles and also cause excessive wear on the dies.

Referring to Table 3, Table 3 reports the data that is shown in FIG. 4. The M&P # in Table 3 corresponds to the Powder Batch number in FIG. 4 per the Table G below.

TABLE G

Correspondence between Table 3 and FIG. 4

| Table 3 | FIG. 4 |
|---|---|
| CT2454373 | 1 |
| CT2474995 | 2 |
| CT2531271 | 3 |
| CT2536520 | 4 |
| CT2613645 | 5 |
| CT2613868 | 6 |

Figure 5:
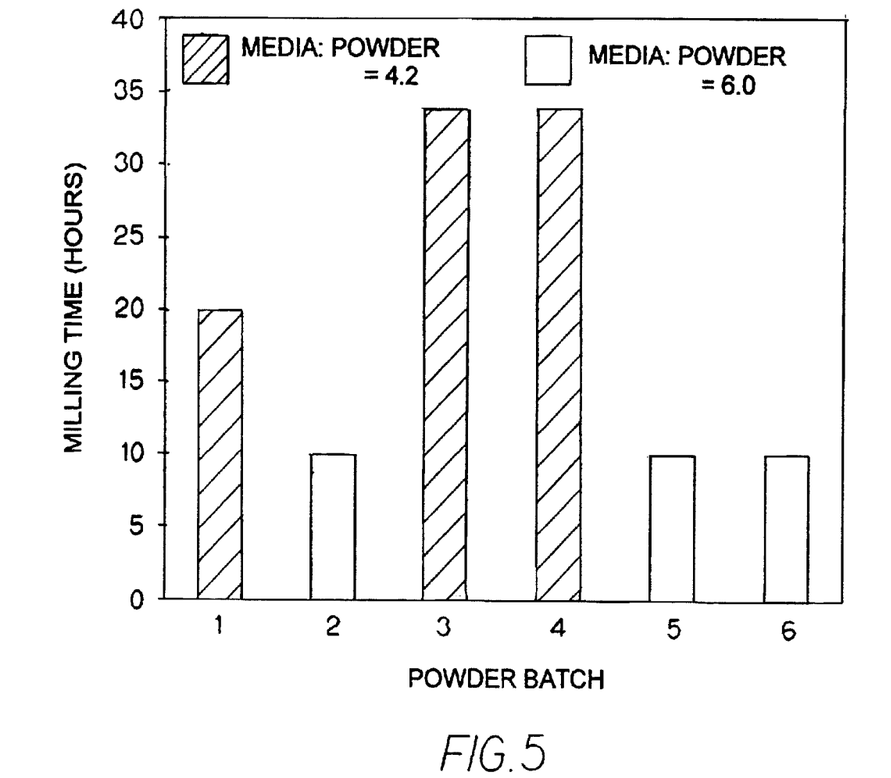
FIG. 5 is a bar chart that reports the milling time (in hours) for powder batches (i.e., powder of hard material) with different media:powder ratio.

Referring to FIG. 5, this bar chart reports the milling time for six powder batches that have a composition that comprised about 94 weight percent tungsten carbide and about 6 weight percent cobalt. The bars with lining represent the results from a process wherein the media:powder ratio was equal to 4.2 and the clear bars represent the results from a process wherein the media:powder ratio was equal to 6.0. For Bars Nos. 1 and 2, KM 1508 was used as an inhibitor. For Bars Nos. 3-6, Metamax I-15 was used as inhibitor. The results reported in FIG. 5 show that milling time in hours, which is the time it took to achieve the powder grade specification for the powder, dramatically decreased when using a media:powder ratio equal to 6.0 as compared to a media:powder ratio that was equal to 4.2 when using KM 1508. The results reported in FIG. 5 show that milling time in hours, which is the time it took to achieve the powder grade specification for the powder, dramatically decreased when using a media:powder ratio equal to 6.0 as compared to a media:powder ratio that was equal to 4.2 when using Metamax I-15.

Figure 6:
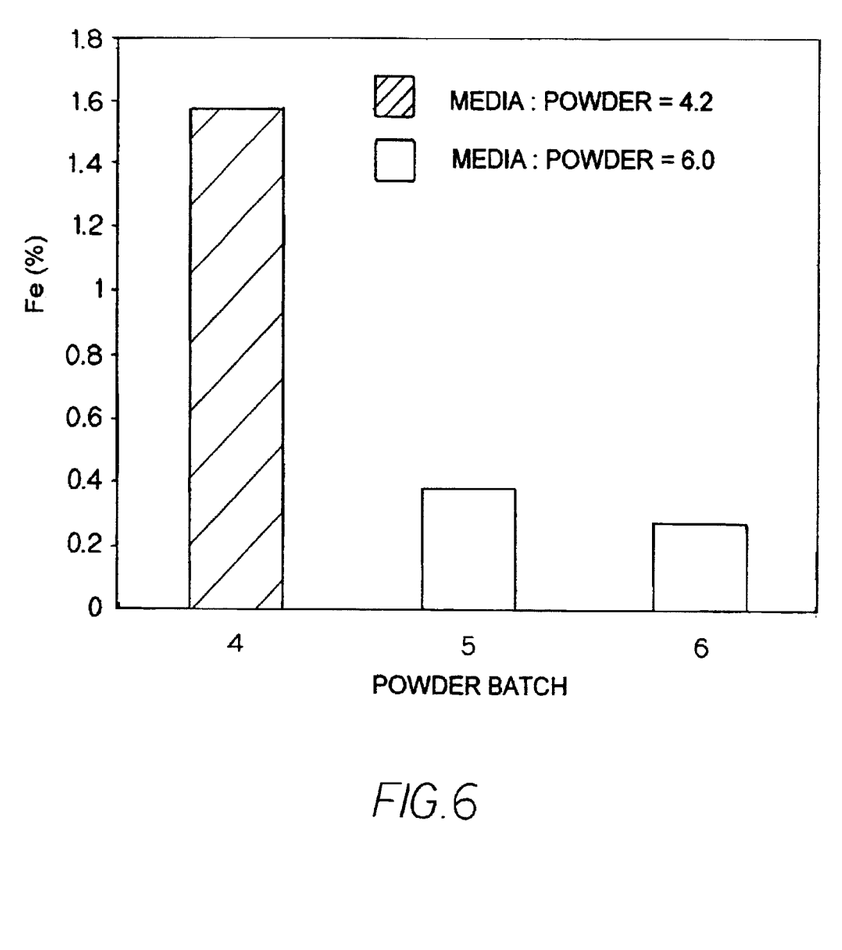
FIG. 6 is a bar chart that shows the iron contamination (Fe %) for powder batches (i.e., powder of hard material) with different media:powder ratio.

Referring to Table 4, Table 4 reports the data that is shown in FIG. 5 and in FIG. 6. The M&P # in Table 4 corresponds to the Powder Batch number in FIGS. 5 and 6 per the Table H below.

TABLE H

Correspondence between Table 4 and FIGS. 5 and 6

| Table 4 | FIGS. 5 & 6 |
|---|---|
| CT2034326 | 1 |
| CT2454373 | 2 |
| CT2331274 | 3 |
| CT2331901 | 4 |
| CT2531119 | 5 |
| CT2454375 | 6 |

Referring to FIG. 6, this is a bar chart that shows the Fe % for three powder batches that have a composition that comprised about 94 weight percent tungsten carbide and about 6 weight percent cobalt. In the processing, the lined bar represents a powder batch processed with the media:powder ratio equal to 4.2 and the clear bars represent a powder batches processed using a process with the media:powder ratio equal to 6.0. FIG. 6 show that the iron (Fe %) contamination dropped from 1.58% after 34 hours of milling to 0.39% after 10 hours when using the Metamax I-15 and 0.28% after 10 hours of milling when using the KM 1508 inhibitor. The results reported in FIG. 6 show that the higher media:powder ratio results in a reduction of the iron contamination.

Figure 7:
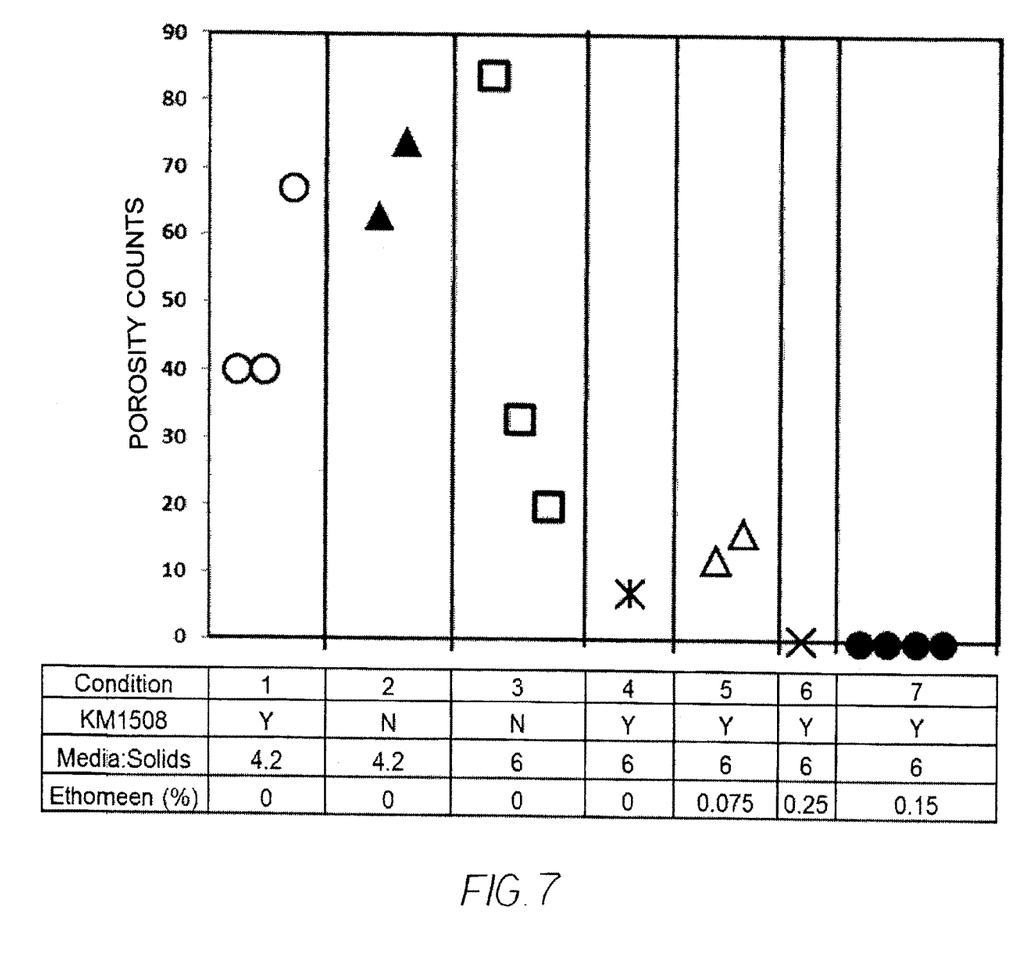
FIG. 7 is a chart that provides a summary of benefits.

Referring to Table 4, Table 4 reports the data that is shown in FIG. 7. The M&P # in Table 4 corresponds to the Powder Batch number in FIG. 7 per the Table 1 below.

TABLE I

Correspondence between Table 4 and FIG. 7

| Table 4 | FIG. 7 |
|---|---|
| CT2331901 | 4 |
| CT2531119 | 5 |
| CT2454375 | 6 |

Referring to FIG. 7, this chart provides a summary of benefits by using a higher media:powder ratio, "Ethomeen" and KM 1508 on pores (size greater than 25 microns per unit area). KM1508 contains green strength additive. It shows that best results are obtained (i.e. zero porosity) using a higher media:powder ratio, KM1508 and "Ethomeen".

Set forth below are Table 1 through 4, which report data shown in graph form in the earlier figures.

TABLE 1

Effect of media:powder ratio on porosity count (that have size greater than 25 microns per unit area)

| M & P # | Inhibitor Type | wt. % | Surfactant Type | wt. % | Binder Type | wt. % | Defoamer Type | wt. % | Milling Time (hrs) | Media: Powder | Porosity count |
|---|---|---|---|---|---|---|---|---|---|---|---|
| CT2331274 | Aqueous Amines | 0.28 | None | 0 | Wax Dispersion | 1.46 | Alkylpolyalkyleneglycolether | 0.2 | 34 | 4.2 | 60 |
| CT2331901 | Aqueous Amines | 0.28 | None | 0 | Wax Dispersion | 1.46 | Alkylpolyalkyleneglycolether | 0.2 | 34 | 4.2 | 107 |
| CT2034326 | Aqueous Amines & Vinyl Polymers | 0.28 | None | 0 | Wax Dispersion | 1.46 | Alkylpolyalkyleneglycolether | 0.2 | 20 | 4.2 | 200 |
| CT2531119 | Aqueous Amines | 0.28 | None | 0 | Wax Dispersion | 1.46 | Alkylpolyalkyleneglycolether | 0.2 | 10 | 6 | 33 |
| CT2454375 | Aqueous Amines | 0.28 | None | 0 | Wax Dispersion | 1.46 | Alkylpolyalkyleneglycolether | 0.2 | 10 | 6 | 20 |
| CT2454373 | Aqueous Amines & Vinyl Polymers | 0.28 | None | 0 | Wax Dispersion | 1.46 | Alkylpolyalkyleneglycolether | 0.2 | 10 | 6 | 7 |

TABLE 2

Effect of KM508 and Ethomeen on porosity count (that have size greater than 25 microns per unit area)

| M & P # | Inhibitor Type | wt. % | Surfactant Type | wt. % | Binder Type | wt. % | Defoamer Type | wt. % | Milling Time (hrs) | Media: Powder | Porosity Count |
|---|---|---|---|---|---|---|---|---|---|---|---|
| CT2531119 | Aqueous Amines | 0.28 | None | 0 | Wax Dispersion | 1.46 | Alkylpolyalkylene-glycolether | 0.2 | 10 | 6 | 33 |
| CT2454375 | Aqueous Amines | 0.28 | None | 0 | Wax Dispersion | 1.46 | Alkylpolyalkylene-glycolether | 0.2 | 10 | 6 | 20 |
| CT2454373 | Aqueous Amines & Vinyl Polymers | 0.28 | None | 0 | Wax Dispersion | 1.46 | Alkylpolyalkylene-glycolether | 0.2 | 10 | 6 | 7 |
| CT2474995 | Aqueous Amines & Vinyl Polymers | 0.28 | Polyoxyethylene (5) soyaalkylamines | 0.15 | Wax Dispersion | 1.46 | Alkylpolyalkylene-glycolether | 0.2 | 10 | 6 | 0 |
| CT2531271 | Aqueous Amines & Vinyl Polymers | 0.28 | Polyoxyethylene (5) soyaalkylamines | 0.15 | Wax Dispersion | 1.46 | Alkylpolyalkylene-glycolether | 0.2 | 9 | 6 | 0 |
| CT2536520 | Aqueous Amines & Vinyl Polymers | 0.28 | Polyoxyethylene (5) soyaalkylamines | 0.15 | Wax Dispersion | 1.46 | Alkylpolyalkylene-glycolether | 0.2 | 9 | 6 | 0 |

TABLE 3

Effect of Ethomeen on pressing pressure

| M & P # | Inhibitor Type | wt. % | Surfactant Type | wt. % | Binder Type | wt. % | Defoamer Type | wt. % | Milling Time (hrs) | Media: Powder | 1.2 DF Pressing Pressure (TSI) |
|---|---|---|---|---|---|---|---|---|---|---|---|
| CT2454373 | Aqueous Amines & Vinyl Polymers | 0.28 | None | 0 | Wax Dispersion | 1.46 | Alkylpolyalkylene-glycolether | 0.2 | 10 | 6 | 12.0 |
| CT2474995 | Aqueous Amines & Vinyl Polymers | 0.28 | Polyoxyethylene (5) soyaalkylamines | 0.15 | Wax Dispersion | 1.46 | Alkylpolyalkylene-glycolether | 0.2 | 10 | 6 | 11.0 |
| CT2531271 | Aqueous Amines & Vinyl Polymers | 0.28 | Polyoxyethylene (5) soyaalkylamines | 0.15 | Wax Dispersion | 1.46 | Alkylpolyalkylene-glycolether | 0.2 | 9 | 6 | 9.1 |
| CT2536520 | Aqueous Amines & Vinyl Polymers | 0.28 | Polyoxyethylene (5) soyaalkylamines | 0.15 | Wax Dispersion | 1.46 | Alkylpolyalklene-glycolether | 0.2 | 9 | 6 | 10.8 |
| CT2613645 | Aqueous Amines & Vinyl Polymers | 0.28 | Polyoxyethylene (5) soyaalkylamines | 0.15 | Wax Dispersion | 1.46 | Alkylpolyalkylene-glycolether | 0.2 | 8.4 | 6 | 10.49 |
| CT2613868 | Aqueous Amines & Vinyl Polymers | 0.28 | Polyoxyethylene (5) soyaalkylamines | 0.15 | Wax Dispersion | 1.46 | Alkylpolyalkylene-glycolether | 0.2 | 8.4 | 6 | 10.68 |

TABLE 4

Effect of media:powder ratio on milling time and Fe contamination

| M & P # | Inhibitor Type | wt. % | Surfactant Type | wt. % | Binder Type | wt. % | Defoamer Type | wt. % | Milling Time (hrs) | Media: Powder | Fe % |
|---|---|---|---|---|---|---|---|---|---|---|---|
| CT2034326 | Aqueous Amines & Vinyl Polymers | 0.28 | None | 0 | Wax Dispersion | 1.46 | Alkylpolyalkyleneglycolether | 0.2 | 20 | 4.2 | |
| CT2454373 | Aqueous Amines & Vinyl Polymers | 0.28 | None | 0 | Wax Dispersion | 1.46 | Alkylpolyalkyleneglycolether | 0.2 | 10 | 6 | 0.28 |
| CT2331274 | Aqueous Amines & | 0.28 | None | 0 | Wax Dispersion | 1.46 | Alkylpolyalkyleneglycolether | 0.2 | 34 | 4.2 | |
| CT2331901 | Aqueous Amines | 0.28 | None | 0 | Wax Dispersion | 1.46 | Alkylpolyalkyleneglycolether | 0.2 | 34 | 4.2 | 1.58 |
| CT2531119 | Aqueous Amines | 0.28 | None | 0 | Wax Dispersion | 1.46 | Alkylpolyalkyleneglycolether | 0.2 | 10 | 6 | 0.39 |
| CT2454375 | Aqueous Amines | 0.28 | None | 0 | Wax Dispersion | 1.46 | Alkylpolyalkyleneglycolether | 0.2 | 10 | 6 | 0.33 |

It becomes apparent that there are many benefits that result from the present invention. These benefits are set forth below.

The use of the higher media:powder ratio along with the addition of KM1508 and Ethomeen reduce the number of pores (that have a size greater than 25 microns per unit area) in the microstructure of the sintered article. This is an important benefit because microstructural defects like porosity typically reduce the useful life of the sintered article.

The use of Ethomeen drops the pressing pressure for the powder batch material. A reduction in the pressing pressure necessary for satisfactory compaction of the powder into the green body is thought to minimize die wear as well as cracking in the sintered article.

The use of a higher media:powder ratio reduces the milling time necessary to achieve the specified powder properties. A reduction in the milling time reduces production costs and can increase production capacity without adding additional equipment. The high media:powder ratio also results in a reduction of the iron contamination (Fe %) during the milling. Lower iron contamination during the milling minimizes metallurgical defects in the sintered article.

The use of Ethomeen increases the granule size of the powder batch and results in the production of powder batches with narrow granule size distributions. These are advantageous properties for the powder batch material since the granule size of the cemented carbide controls powder flow, pressing pressure and sintering response. The use of Ethomeen also facilitates with the powder slurry discharge from the ball mill. This is an advantageous property for the efficient production of the powder batch material since it saves processing time and improves powder yield.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

The invention claimed is:

1. A powder of hard material produced by the process comprising the steps of:
spray drying an aqueous slurry comprising:
starting powder components of the hard material;
an oxidation inhibitor in an amount of about 0.2 weight percent to about 0.5 weight percent based on weight of the starting powder components of the hard material;
a surfactant in an amount of about 0.05 weight percent to about 0.30 weight percent of the weight of the starting powder components of the hard material;
a binder in an amount of about 1.2 weight percent to about 4.0 weight percent of the weight of the starting powder components of the hard material;
a defoamer in an amount of about 0.05 weight percent to about 0.35 weight percent of the weight of the starting powder components of the hard material; and
water in an amount of about 15 weight percent to about 30 weight percent of the weight of the starting powder components of the hard material; and
the aqueous slurry having a percent solids of about 70 percent to about 85 percent wherein the percent solids comprises a quotient in percent of the weight of the starting powder components of the hard material divided by the sum of the weight of the starting powder components of the hard material and the weight of the water;
wherein granule size distribution of the powder of hard material is $D_{10}$-67.8 microns, $D_{50}$-115.8 microns and $D_{90}$-169.9 microns.

2. The powder of hard material of claim 1, wherein spray drying parameters comprise: an inlet temperature of about 370° C. to about 400° C., an outlet temperature of about 90° C. to about 120° C., a nozzle size of about 0.5 mm to about 3 mm, a nozzle pressure of about 10 bar to about 20 bar, and a chamber pressure of about −5 millibar of about −7 millibar.

3. The powder of hard material of claim 1, wherein the surfactant comprises polyoxyethylene (5) soyaalkylamine.

4. The powder of hard material of claim 3, wherein the polyoxyethylene (5) soyaalkylamine is present in an amount of about 0.075 weight percent to about 0.25 weight percent of the starting powder components of the hard material.

5. The powder of hard material of claim 3, wherein the polyoxyethylene (5) soyaalkylamine is present in an amount of about 0.15 weight percent of the starting powder components of the hard material.

6. The powder of hard material of claim 1, wherein the powder of hard material exhibits a pressing pressure (1.2 DF) that is less than or equal to 11.0 TSI.

7. The powder of hard material of claim 1, wherein the starting powder components comprise a hard metal powder comprising one or more powders of carbides, nitrides and carbonitrides of Group IVB, Group VB and Group VIB transition metals of the Periodic Table and binder metals comprising cobalt, nickel, iron, ruthenium, manganese, silicon, aluminum and copper and their alloys.

8. The powder of hard material of claim 7 wherein the starting powder components of the hard material comprises tungsten carbide powder and cobalt powder, the tungsten carbide powder being present in an amount greater than 50 weight percent of the starting powder components of the hard material, and the cobalt powder being present in up to 50 weight percent of the starting powder components of the hard material.

9. The powder of hard material of claim 8 wherein the tungsten carbide powder is present in an amount of about 90 weight to about 96 weight percent of the starting powder components of the hard material and the cobalt powder is present in an amount of about 4 weight percent to about 10 weight percent of the starting powder components of the hard material.

10. The powder of hard material of claim 1, wherein the binder comprises a wax dispersion.

11. The powder of hard material of claim 1, wherein the defoamer comprises alkylpolyalkyleneglycoether.

* * * * *